No. 614,170. Patented Nov. 15, 1898.
F. M. HOGLEN.
BINDER.
(Application filed Sept. 23, 1896.)
(No Model.)
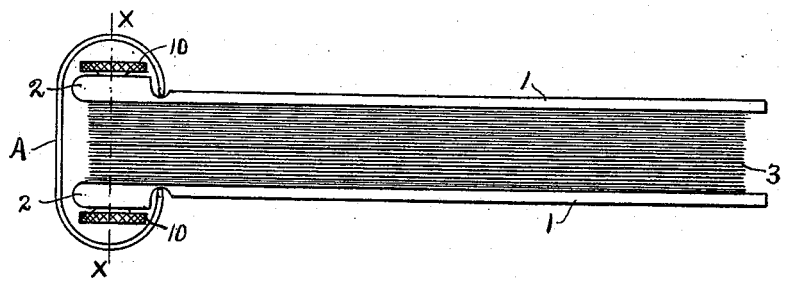
FIG. 1.
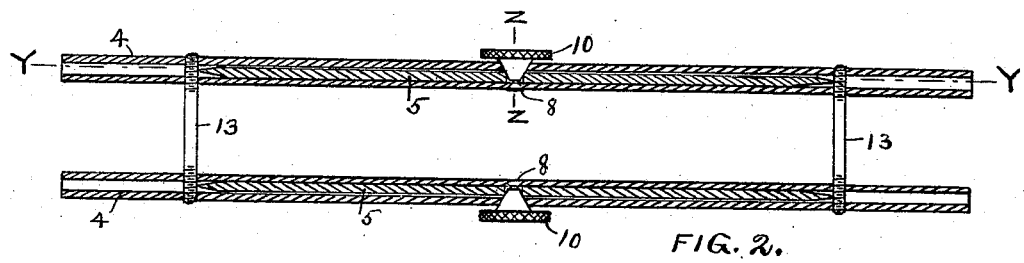
FIG. 2.
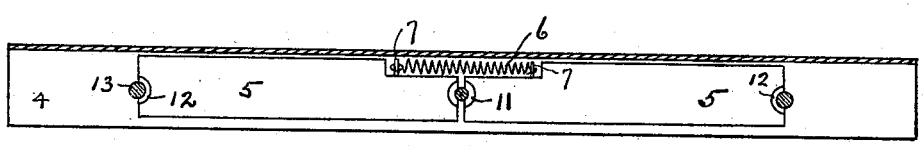
FIG. 3.
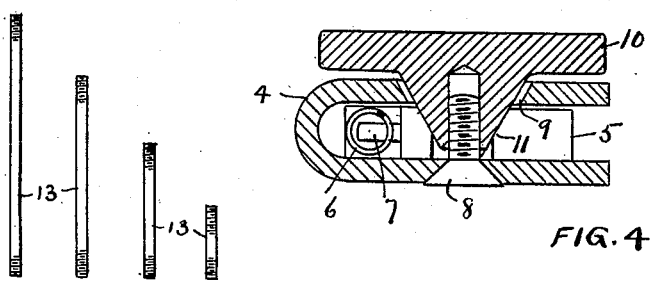
FIG. 4.
FIG. 5.
WITNESS:
G. H. Longard
B. A. Mahony
INVENTOR
FRANK M. HOGLEN.
BY
Casper L. Redfield
ATTORNEY.

UNITED STATES PATENT OFFICE.

FRANK M. HOGLEN, OF LA GRANGE, ILLINOIS.

BINDER.

SPECIFICATION forming part of Letters Patent No. 614,170, dated November 15, 1898.

Application filed September 23, 1896. Serial No. 606,738. (No model.)

*To all whom it may concern:*

Be it known that I, FRANK M. HOGLEN, a citizen of the United States, residing at La Grange, in the county of Cook and State of Illinois, have invented certain new and useful Improvements in Binders, of which the following is a specification.

In the accompanying drawings, Figure 1 is an end elevation of a book composed of loose leaves bound together according to my invention. Fig. 2 is a section on line X X of Fig. 1 with the shield A and the loose leaves omitted. Fig. 3 is a section on line Y Y, and Fig. 4 is an enlarged section on line Z Z, of Fig. 2; and Fig. 5 shows the varying lengths of binding-posts used in connection with the covers.

In the said drawings the covers 1 are incased in cloth in the ordinary manner, which cloth also extends over the enlarged portions 2, between which the leaves 3 are secured and held. The parts 2 are composed of channels 4, in the interior of each of which are two plates 5, that are drawn toward each other by the spring 6, secured to the pins 7. Midway in the length of the channels 4 and at the junction of the plates 5 are the short screws 8, that are brazed or otherwise secured in the channels 4 in the manner shown in Figs. 2 and 4. The opposite side of the channel 4 is cut away at 9 to permit the conical nut 10 to engage and be screwed down on the screw 8, which action serves to spread or separate the plates 5. The plates 5 are countersunk at the point of contact with the nuts 10, as shown at 11 in Fig. 3. The outer ends of the plates 5 have semicircular notches that are beveled, as shown at 12, and concentric with these notches holes are drilled through the channels 4 to permit of the easy insertion of the studs or posts 13. The studs 13, the nuts 10, and the plates 5 are so related to each other that when a nut 10 is screwed down on the fixed screw 8 the plates 5 are forced into contact with the studs 13, so as to hold them firmly in the holes in the channel 4. When a nut 10 is loosened, the spring 6 serves to draw the plates 5 inward, thus releasing the studs 13 and permitting their easy withdrawal from the holes in the channel 4. The studs 13 are shown with threads cut on each end, and the ends of the plates 5 that come in contact with them are shown sharpened to an edge. This is the form in which I make them when I wish to withdraw them from the holes in which they rest without unscrewing the nuts 10. This I can do by simply screwing them out, and I can fill their places with other studs of greater or less length, as may be desired. When I do not wish to do this, I make the studs 13 plain posts and leave the semicircular notches 12 with a flat face and hold the posts by pressure alone.

In using this binder I fasten the studs 13 into one of the channels 4 and then place the loose leaves or papers on these in the ordinary manner. When they are all on, I put on the other channel with its cover, press it down tightly, and then tighten the nut 10. Over these I slide a shield A, which has a length equal to the length of the cover 1. This shield is made of some soft metal covered with cloth and serves to protect the nuts 10 and also to keep them from scratching the table or desk on which the book is laid. By making both covers and the means of holding the studs 13 to them exactly alike the book can be opened with equal facility from either side. When as many leaves or papers have been put in the book as it will conveniently hold, the capacity can be increased by removing one of the covers and without removing the leaves unscrewing one of the studs and substituting therefor another stud of greater length. By repeating this operation with the other stud the book is in condition to receive additional papers.

In furnishing these covers I supply a series of studs of varying lengths, as shown in Fig. 5, by the use of which a single binder becomes a perfect book for any thickness between a few leaves up to as large as can be conveniently handled. By making the shield A of metal that can be bent by a comparatively strong pressure of the hand it can be enlarged or contracted to adapt it to the different thicknesses of the book as papers are added or removed from between the covers.

What I claim is—

1. In combination with the covers of a binder, pins for holding papers between said covers, a clamping device connected to each cover and adapted to engage and hold said pins near their ends, screw-threads or corrugations on said pins at points of engagement with said clamps, and screws for operating said clamps.

2. In combination with the covers of a binder, binding-pins for holding papers between said covers, a clamp connected to each cover for holding said pins, screw-threads on said pins for permitting their removal without releasing said clamps, and a screw connected to each cover for operating said clamps to permit the removal of either cover independently.

3. In combination with the covers of a binder, pins for holding papers between said covers, clamps connected to each cover and adapted to support said pins in an upright position, screws for releasing said clamps so as to permit the removal of either cover independently, and means for permitting the removal of said pins from the remaining cover and inserting others of a different length without releasing the other clamp or disturbing the papers held between said covers.

4. In binders either cover of which is independently removable, pins for holding papers between said covers, and means for permitting the removal of said pins and the insertion of others without disturbing the position of said papers.

5. In combination with the covers of a binder, binding-pins for holding leaves from dropping out and said covers together, screw-threads on said pins, clamps for engaging the threaded portion of said pins, and screws for separating said clamps.

FRANK M. HOGLEN.

Witnesses:
CASPER L. REDFIELD,
J. E. RANDELL.